(12) United States Patent
Pomerantz

(10) Patent No.: US 8,677,040 B2
(45) Date of Patent: Mar. 18, 2014

(54) HOST-PERIPHERAL ADAPTOR

(75) Inventor: Itzhak Pomerantz, Kfar Saba (IL)

(73) Assignee: Sandisk IL Ltd., Kfar Saba (IL)

( * ) Notice: Subject to any disclaimer, the term of this patent is extended or adjusted under 35 U.S.C. 154(b) by 381 days.

(21) Appl. No.: 12/361,495

(22) Filed: Jan. 28, 2009

(65) Prior Publication Data

US 2010/0191879 A1    Jul. 29, 2010

(51) Int. Cl.
*G06F 3/00* (2006.01)
*G06F 5/00* (2006.01)
*G06F 13/12* (2006.01)
*G06F 13/38* (2006.01)

(52) U.S. Cl.
USPC .................................. 710/73; 710/38; 710/62

(58) Field of Classification Search
USPC .................................. 710/38, 62, 73
See application file for complete search history.

(56) References Cited

U.S. PATENT DOCUMENTS

| | | | | |
|---|---|---|---|---|
| 5,630,174 | A * | 5/1997 | Stone et al. | 710/63 |
| 5,641,314 | A * | 6/1997 | Broschard et al. | 439/751 |
| 6,073,201 | A * | 6/2000 | Jolley et al. | 710/315 |
| 6,286,060 | B1 * | 9/2001 | DiGiorgio et al. | 710/31 |
| 6,579,108 | B1 * | 6/2003 | Goff | 439/131 |
| 6,736,678 | B2 * | 5/2004 | Yao | 439/638 |
| 2001/0047441 | A1 * | 11/2001 | Robertson | 710/65 |
| 2002/0084988 | A1 * | 7/2002 | Kuo | 345/168 |
| 2005/0027910 | A1 * | 2/2005 | Barrett et al. | 710/62 |
| 2005/0208967 | A1 * | 9/2005 | Buniatyan | 455/557 |
| 2006/0034180 | A1 * | 2/2006 | Gellerman et al. | 370/241 |
| 2006/0219776 | A1 * | 10/2006 | Finn | 235/380 |
| 2007/0205867 | A1 * | 9/2007 | Kennedy et al. | 340/10.1 |
| 2010/0033310 | A1 * | 2/2010 | Narendra et al. | 340/10.51 |

FOREIGN PATENT DOCUMENTS

WO    0205102 A1    1/2002

OTHER PUBLICATIONS

StarTech.com USB Based CardBus to ExpressCard Laptop Adapter Card EC2CBU, Sep. 14, 2004, http://www.amazon.com/StarTech-com-CardBus-ExpressCard-Adapter-EC2CBU/dp/B001OC5IKA/ref=sr_1_22?ie=UTF8&(qid=1340050614&sr=8-22 &keywords=pcmcia+adapter.*

* cited by examiner

*Primary Examiner* — Kris Rhu
(74) *Attorney, Agent, or Firm* — Toler Law Group, PC

(57) ABSTRACT

A host-peripheral adaptor includes a host adaptor and a portable peripheral adaptor. The host adaptor includes a substantially flat peripheral-adaptor-side interface. The peripheral-adaptor-side interface is designed in a way that it is not easy to tamper with. The portable peripheral adaptor includes a host-adaptor-side interface that is designed to operatively connect to the peripheral-adaptor-side interface of the host adaptor. The portable peripheral adaptor also includes one or more peripheral-side interfaces for accommodating one or more peripheral devices such as a storage media. The portable peripheral adaptor and the host adaptor include a set of data lines and the host adaptor also includes circuitry for recognizing the specific type of a peripheral device and, based on its specific type, for setting a suitable communication path to transfer data between a host and the peripheral device.

20 Claims, 12 Drawing Sheets

HOST-PERIPHERAL ADAPTOR

FIELD OF THE INVENTION

The present invention generally relates to electronic adaptors and more specifically to peripheral device adaptors.

BACKGROUND

Consumers wishing to print digital photographs have the option to visit public printing kiosks located, for example, in drug stores or in shopping malls, with the storage devices of the consumers containing files of the photographs. Example storage devices commonly accommodated by printing kiosks are SD cards and Universal Flash Drives ("UFDs"). Without waiting for the availability of a store attendant, the consumers may order prints according to their individual needs and desires by using a digital print ordering machine generally known as "photokiosk" and "photo ordering stations". Photokiosks are supplied, for example, by Mythology Tech Express Inc. and June Systems Co, Ltd.

A typical photokiosk for printing photographs has a host computer and a user console with various ports for connecting the photokiosk's host computer to the consumers' storage media that holds the digital photograph files. Ports on the consoles, such as those for SD cards and UFDs, include relatively deep and delicate sockets that are sensitive to accidental damage and intentional tampering such as attempting to stick sharp objects into the sockets. Given the prevalence though of storage media using such ports, kiosk operators had to accept the risk of damage and tampering if they were to maintain operation of the kiosks. Such problems are the main cause for down-time of such photos ordering systems.

Such a phenomenon is not limited to the scenario of a public printing kiosk for digital files of photographs. For example, consumers wishing to purchase musical files for MP3 players may prefer physical downloading rather than search for a facility to provide Internet connection to an online music vendor. A host equipped to download music files onto consumers' storage media should have suitable ports to accommodate the popular storage media at any given time. An important priority would be to maintain the ports in proper working order to maximize the time that the host is available to serve the consumers. Therefore, even one damaged port has the potential to cause a significant loss of revenue, and this is even more so, especially if the damaged port is designed to accommodate a widely used storage media format. There are other examples of hosts that interface with peripheral devices using ports that are exposed to the public.

In addition, data storage devices such as USB devices, miniUSB cards, SD cards MicroSD cards, Memory sticks, Smart Cards, etc. come with a variety of connectors. Providing a separate socket for each type of connector consumes space on the user console.

A reoccurring need is that there be available a resilient interface between the hosts and the peripheral devices. Such an interface should be less susceptible to damage, whether intentional or inadvertent, and should be compatible with different types of hosts and peripheral devices.

SUMMARY

A design approach based in part on the foregoing observations is provided to enable adaptors to provide a resilient and thus reliable interface between hosts and their peripheral devices. The adaptors can be designed for compatibility with different standards for host/peripheral interfaces.

To address the foregoing, a peripheral device adaptor is provided, which includes a host adaptor and a portable peripheral adaptor. The host adaptor includes a substantially flat interface, which is referred to hereinafter as a "peripheral-adaptor-side interface". The peripheral-adaptor-side interface is designed in a way that it is not easy to tamper with. The portable peripheral adaptor includes a "host-adaptor-side interface" that is electrically and mechanically designed to operatively connect to the peripheral-adaptor-side interface of the host adaptor. The portable peripheral adaptor also includes one or more "peripheral-side interfaces" for accommodating one or more peripheral devices and operatively connecting them to the host. Peripheral devices may include storage media, e.g., an SD card, a memory stick, a smart card, etc.

The portable peripheral adaptor and the host adaptor include a set of data lines via which data is transferred between the host and the peripheral devices. The host adaptor also includes circuitry for recognizing the specific type of the peripheral device and, based on the specific type of the peripheral device, for selecting specific data lines for the data transfer. The circuitry may include or use electrical "bridges" (i.e., jumpers), an RFID mechanism, a "protrusion-actuated switch" mechanism, a keyboard, or a touch screen to recognize the specific type of the peripheral device.

Users wishing to connect a peripheral to a host can either use their own private peripheral adaptor or they can borrow such an adaptor, for example from the kiosk owning or operating the host.

BRIEF DESCRIPTION OF THE DRAWINGS

Various exemplary embodiments are illustrated in the accompanying figures with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures.

DETAILED DESCRIPTION

The description that follows provides various details of exemplary embodiments. However, this description is not intended to limit the scope of the claims but instead to explain various principles of the invention and the manner of practicing it.

In a communication signal path between a host and a peripheral device is a host adaptor, which may be mounted on a console or panel. Also in the communication signal path is a portable peripheral adaptor. The host adaptor is configured to electrically and to mechanically connect to the host, and the peripheral adaptor is configured to electrically and to mechanically connect to the peripheral device. The host adaptor and the peripheral adaptor electrically and mechanically detachably connect to each other by way of resilient interfaces.

The disclosure is not limited to scenarios involving only one connection standard or one form factor for a peripheral device. Different peripheral devices may be accommodated. For example, one customer may connect an SD card to the kiosk's host computer, and another customer may connect a UFD to the kiosk's host computer, etc. Accordingly, one peripheral adaptor may have a socket for receiving the SD card and another peripheral adaptor may have a socket for receiving the UFD, etc. Alternatively, one peripheral adaptor may have a first socket for receiving the SD card and a second socket for receiving the UFD, Each peripheral adaptor would have a resilient interface for connecting to the host adaptor. The host adaptor is able to determine the communication path via which the data signals of the peripheral device can be transferred to and from an appropriate port of the host. In the present example, the host adaptor would transfer the data signals to and from the SD port or the USB port as appropriate. With the present design approach, the host and peripheral device remain functional despite any change in communication standard. One relatively-inexpensive peripheral adaptor may be used for each standard or type of peripheral device that is to interface with the host, and one host adaptor is commonly used by all peripheral adaptors regardless of the type of peripheral devices.

Figure 1:
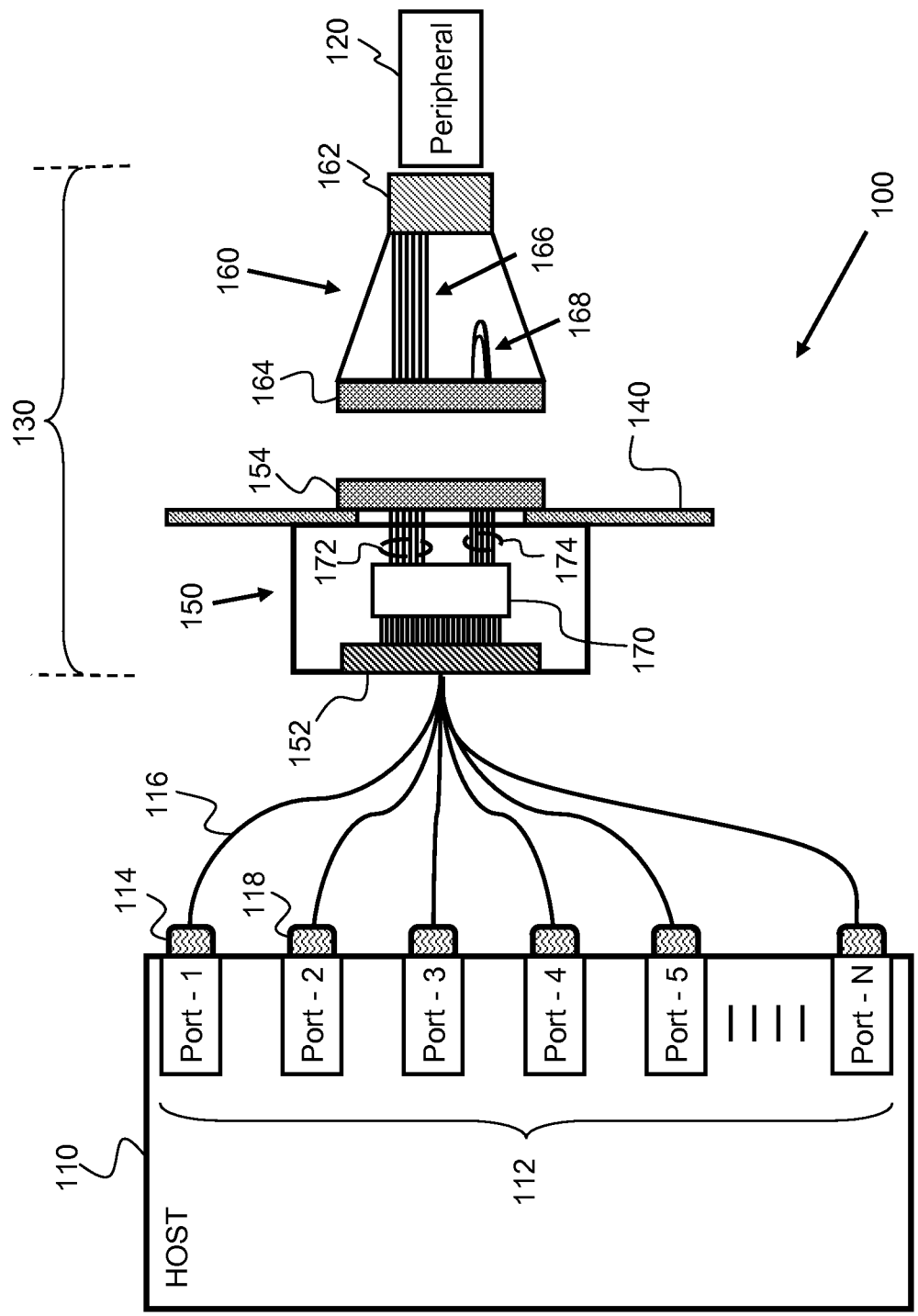
FIG. 1 schematically illustrates a peripheral device setup according to an example embodiment.

FIG. 1 illustrates a data communication system 100 according to an example embodiment. Data communication system 100 includes a host 110 that can exchange data with peripheral devices such as peripheral device 120. Data communication system 100 also includes a peripheral device adaptor 130 via which host 110 can interface with peripheral device 120.

Peripheral device adaptor 130 includes a host adaptor 150 and a peripheral adaptor 160. Host adaptor 150 includes a host-side interface 152 and a peripheral-adaptor-side interface 154. Host-side interface 152 may include multiple connectors (not shown in FIG. 1), at least some of which may be configured to transfer data signals of one or more communication protocols. Peripheral-adaptor-side interface 154 may be substantially flat. In this embodiment, host 110 is protected behind a panel 140 from the public and host adaptor 150 is mounted on panel 140.

Peripheral adaptor 160 includes a peripheral-side interface 162. Peripheral-side interface 162 has a socket (not shown in FIG. 1) for accommodating peripheral device 120 both mechanically and electrically. Peripheral device 120 is shown in FIG. 1 detached from peripheral adaptor 160. Peripheral-side interface 162 is configured to transfer data signals to and from peripheral device 120.

Peripheral adaptor 160 also includes a host-adaptor-side interface 164 that is configured to operatively connect to (i.e., to operatively engage or mate with) peripheral-adaptor-side interface 154 both mechanically and electrically, and to transfer data and recognition signals to and from host adaptor 150 through peripheral-adaptor-side interface 154. Host-adaptor-side interface 164 may have moving parts though this is not necessary. The recognition signals are indicative of the type of peripheral device 120. The type of peripheral device 120 may be associated with a communication protocol used by peripheral device 120 and/or with the form factor of peripheral device 120.

Figure 2:
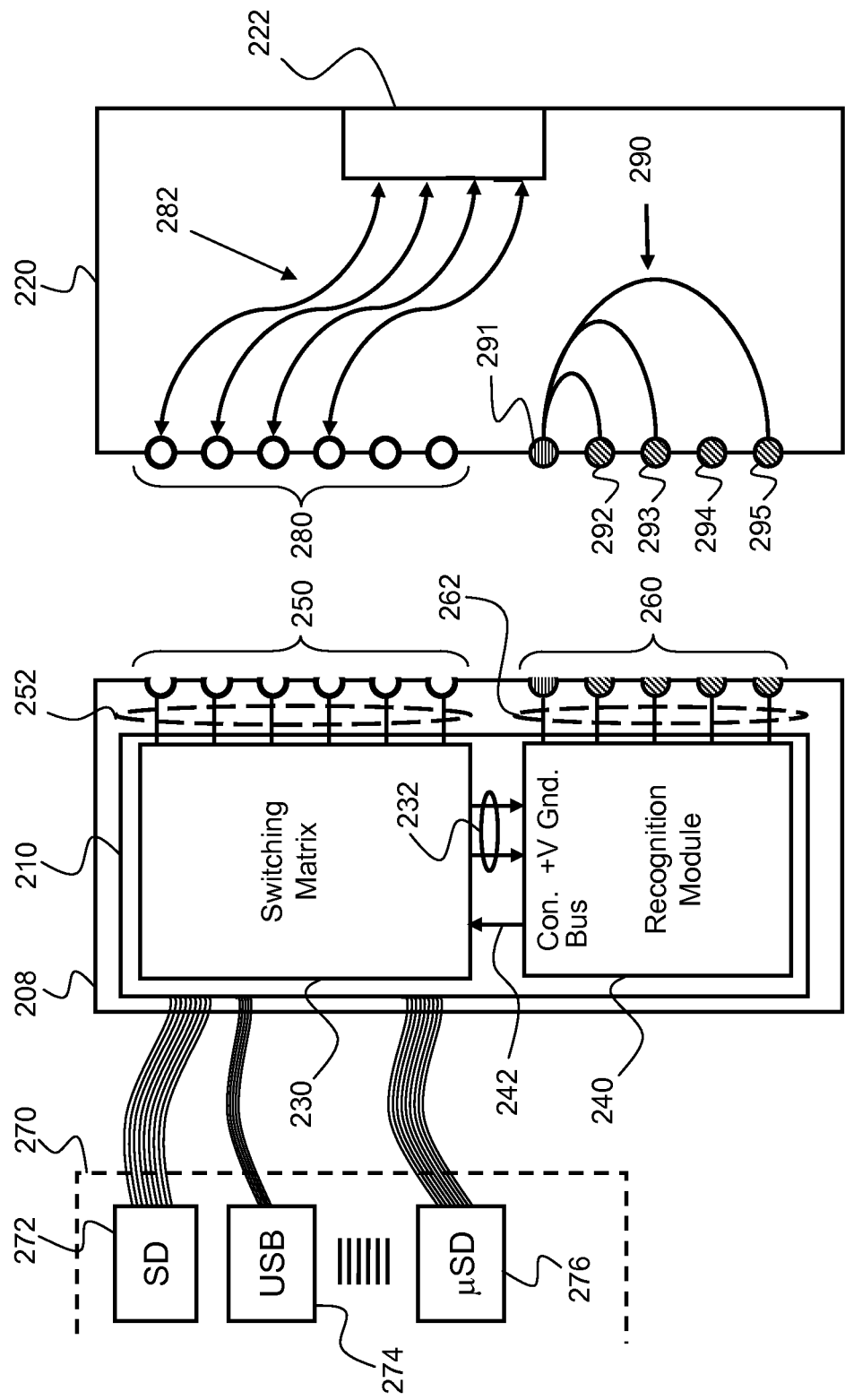
FIG. 2 is a simplified block diagram of a host adaptor and a peripheral adaptor according to an example embodiment.

Peripheral adaptor 160 also includes conductors 166 (which are referred to hereinafter as "peripheral data conductors") through which the data signals flow between peripheral-side interface 162 and host-adaptor-side interface 164. Peripheral adaptor 160 also includes conductors 168 (which are referred to hereinafter as "peripheral recognition conductors") through which the recognition signals flow between host adaptor 150 and peripheral adaptor 160. Peripheral recognition conductors 168 are configured to indicate the type of the peripheral engaging peripheral adaptor 160; e.g., the type of peripheral device 120. The indication of the type of an engaged peripheral is referred to hereinafter as the "peripheral's type code". The way peripheral type codes are configured is shown in FIG. 2, which is described below.

Host 110 includes N communication ports 112 (which are designated as "Port-1", "Port-2", "Port-3", ..., "Port-N") for communicating with different types of peripheral devices. "N" may equal 1. "Different types of peripheral devices" generally means different types of communication protocols or form factors. For example, host 110 may use Port-1 to communicate with SD cards; Port-2 to communicate with USB devices; Port-3 to communicate with micro-SD cards; Port-4 to communicate with memory stick devices; Port-5 to communicate with smart cards, etc.

N communication ports 112 are respectively connected to host-side interface 152 via N connectors. For example, the port designated as "Port-1" is operatively connected to host-side interface 152 via connector 114 and cable 116; the port designated as "Port-2" is operatively connected to host-side interface 152 via connector 118 and a corresponding cable, and so on. Host-side interface 152 may be or include one or more multi-pin connectors (not shown in FIG. 1) and each of the one or more multi-pin connectors may be wired to one or more of N ports 112. Host-side interface 152 is configured to transfer data signals to and from N communication ports 112 through the one or more multi-pin connectors.

Host adaptor 150 also includes a circuitry 170. Circuitry 170 is connected to peripheral-adaptor-side interface 154 via conductors 172 through which host 110 and peripheral device 120 exchange data, and through which host 110 may provide power to peripheral device 120. Conductors 172 are referred to hereinafter as "host data conductors". Circuitry 170 is also connected to peripheral-adaptor-side interface 154 via conductors 174, through which recognition signals can flow. Conductors 174 are referred to hereinafter as "host recognition conductors". When host adaptor 150 and peripheral adaptor 160 are engaged, host data conductors 172 are respectively connected to peripheral data conductors 166 through peripheral-adaptor-side interface 154 and host-adaptor-side interface 164. Therefore, circuitry 170 may be thought of as an extension of peripheral device 120. Not all of peripheral data conductors 166 and host data conductors 172 have to be used by an engaged peripheral because the data conductors to be used by the engaged peripheral are devised according to the type of the peripheral. For example, if peripheral device 120 is a USB device, only four of host data conductors 172 and four of peripheral data conductors 166 are used to transfer the data signals from circuitry 170 to peripheral device 120, and vice versa. Because peripheral devices require power for operation, two or more of data conductors 166 and data conductors 172 are used as their power line.

Likewise, when host adaptor 150 and peripheral adaptor 160 are engaged, host recognition conductors 174 are respectively connected to peripheral recognition conductors 168 through peripheral-adaptor-side interface 154 and host-adaptor-side interface 164. On one hand, circuitry 170 is an extension of peripheral device 120 that needs to be connected to one of host ports 112. On the other hand, host 110 includes N ports 112 that facilitate N potential communication paths between host 110 and circuitry 170. Therefore, a decision has to be made by circuitry 170, as to which port of host ports 112 (i.e., which of the N communication paths) is suitable for peripheral device 120. In other words, circuitry 170 has to decide which communication path has to be set between host data conductors 172 (and thus between peripheral device 120) and host 110. In order to decide which communication path should be set circuitry 170 initiates and uses recognition signals, which are transferred between circuitry 170 and peripheral adaptor 160 via host recognition conductors 174 and peripheral recognition conductors 168.

The port (and the related communication path) through which the data is transferred between host 110 and peripheral device 120 is selected by circuitry 170 automatically, according to a peripheral's type code that is derived from the recognition signals, as shown in FIG. 2, which is described below. That is, circuitry 170 sets a communication path between peripheral device 120 and a suitable port of host 110 (e.g., Port-6) based on the peripheral's type code of peripheral device 120, and transfers data accordingly. In a manner discussed below, the recognition signals indicate a communication path through which data signals can be transferred between host 110 and peripheral device 120.

Peripheral adaptor 160 does not include a power source and peripheral device 120 can be powered, through peripheral adaptor 160, either by host adaptor 150 or by host 110 and through host adaptor 150. For example, peripheral device 120 may be powered through some of data conductors 172 and data conductors 166. Alternatively, peripheral device 120 may be powered through dedicated conductors in peripheral adaptor 160. Alternatively, peripheral adaptor 160 may include a power source for powering peripheral device 120.

Peripheral-adaptor-side interface 154 of host adaptor 150 detachably connects to peripheral adaptor 160 at its host-adaptor-side interface 164. In this embodiment, host adaptor 150 and peripheral adaptor 160 are held together by magnetic attraction. This may be achieved by placing a magnet at the surface or near the surface of one of host adaptor 150 and peripheral adaptor 160, and placing a ferromagnetic material at the surface or near the surface of the other of host adaptor 150 and the peripheral adaptor 160. Alternatively, peripheral-adaptor-side interface 154 and peripheral adaptor 160 can be held together by a bayonet-mount arrangement. Briefly, a bayonet mount, or bayonet connector, is a male-female fastening mechanism that relies on mated surfaces: the male side has one or more pins or slots, and the female receptor has matching slots and a spring that maintains a clamping force. The male side and the female receptor are coupled by aligning the pin(s) on the male with the slot(s) on the female, pushing the two against each together and turning the two surfaces in opposite directions to guide the pin(s) into the slot(s).

A method for using peripheral device adaptor 130 is also provided. The method includes getting recognition signals to be created in host adaptor 150 or flow between host adaptor 150 and peripheral adaptor 160 (i.e., via host recognition conductors 174 and peripheral recognition conductors 168), which are configured for transferring data signals (i.e., via host data conductors 172 and peripheral data conductors 166) with which the recognition signals are associated. The method also includes determining (i.e., by circuitry 170) from the recognition signals a communication path (not shown in FIG. 1) for the data signals, and transferring the data signals between peripheral adaptor 160 and host 150 via the determined communication path.

FIG. 2 illustrates circuitry 210 and a peripheral adaptor 220 according to an example embodiment. Circuitry 210 includes a switching matrix 230 and a recognition module 240. Switching matrix 230 is functionally interposed between ports of a host 270 and contacts 250. Host data conductors 252 are connected to contacts 250. Therefore, contacts 250 are referred to hereinafter as "host data contacts". Though not shown in FIG. 2, the ports of host 270 (i.e., ports 272, 274, 276, etc.) are wired to circuitry 210 via a host-side interface similar to host-side interface 152 of FIG. 1.

Host data contacts 250 are connected to switching matrix 230 by host data conductors 252. Only three ports are shown in FIG. 2 for brevity: ports 272, 274, and 276. By way of example, port 272 is SD-compliant; port 274 is USB-compliant port; and port 276 is microSD-compliant. Being connected to host 270 via several ports, switching matrix 230 may receive electrical power from host 270 via any port, for example via the power line of USB port 274.

Circuitry 210 also includes a set of electrical contacts 260 that are connected to recognition module 240 by electrical conductors 262. Electrical contacts 260 are referred to hereinafter as "host recognition contacts". Electrical conductors 262 are referred to hereinafter as "host recognition conductors".

Recognition module 240 is functionally interposed between switching matrix 230 and host recognition contacts 260. Recognition module 240 receives electrical power from switching matrix 230 via "+V" and "Gnd." terminals 232, and provides control signals to switching matrix 230, via Control Bus 242, to set a communication path between suitable contacts of host data contacts 250 and a suitable port of host 270. The control signals, which recognition module 240 transfers to switching matrix 230 via Control Bus 242, depend, derived from, or are based on recognition signals that flow to and from recognition module 240 via host recognition conductors 262 and host recognition contacts 260, as explained in more details in connection with peripheral adaptor 220, which is described below.

One contact of host recognition contacts 260 (that contact being referred to hereinafter as a "host common contact") is constantly forced to a predetermined reference voltage. The reference voltage may be, for example, the power supply's voltage (i.e., "+V") or its ground (i.e., "Gnd."). The host common contact may be forced to the reference voltage, for example, by being internally (i.e., in recognition module 240) connected to the "+V" terminal or to the "Gnd." terminal.

The voltage value at each of the remaining host recognition contacts 260 (i.e., host recognition contacts 260 excluding the host common contact) may either be at the reference level, which may be associated, for example, with a binary value "0", or at another level, which may be associated with a binary value "1". The binary value (i.e., "0" or "1") of each of the remaining host recognition contacts 260 depends on the reference voltage and on the peripheral device's type code set in peripheral adaptor 220, as explained below.

Peripheral adaptor 220 includes a peripheral socket 222 for accommodating a peripheral device such as peripheral device 120 of FIG. 1, a set of electrical contacts 280 (hereinafter called "peripheral data contacts") that, by way of example, includes six peripheral data contacts, four of which are connected to peripheral socket 222 by electrical conductors (i.e., by peripheral data conductors) 282. Peripheral data conductors 282 facilitate data transfer between an engaged peripheral device and host 270 via the communication path set by recognition module 240. Peripheral adaptor 220 also includes a set of electrical contacts that, by way of example, includes five electrical contacts 291, 292, 293, 294, and 295 (hereinafter called "peripheral device recognition contacts") for allowing recognition signals to flow to and from wiring setup (i.e., through peripheral recognition conductors) 290. Wiring setup 290 closes an electrical loop with recognition module 240 via host recognition conducts 262 and host recognition contacts 260. Wiring setup 290 may be implemented as a set of jumpers, as shown in FIG. 2, or by a DIP switch. Briefly, a "DIP switch" is a set of manual electric switches that are packaged in a group in a standard dual in-line package (DIP). This type of switch is commonly used to customize the behavior of an electronic device for specific situations, in this embodiment to set a corresponding peripheral device's type code.

In this embodiment, peripheral adaptor 220 includes one peripheral socket (i.e., socket 222) and an unchangeable peripheral device's type code that is set by wiring setup 290. While host adaptor 208 and peripheral adaptor 220 are engaged, peripheral device recognition contact 291 is forced by the host common contact to the reference voltage mentioned above. Peripheral device recognition contact 291 can be electrically "bridged" to any of peripheral device recognition contacts 292 through 295 and the actual bridging depends on the type of the peripheral device to be inserted into socket 222, as explained in more details below.

Depending on the electrical bridges of wiring setup 290, each of peripheral device recognition contacts 292 through 295, which function as a binary bit, is either at the reference voltage or at the other voltage level. By way of example, peripheral device recognition contacts 292, 293, and 295 are electrically connected to the reference voltage via peripheral device recognition contact 291, whereas peripheral device recognition contact 294 is not connected to the reference voltage.

An electrically bridged peripheral device/host recognition contact may logically be interpreted as binary value "0" or "1" depending on the used reference voltage (i.e., "+V" or "Gnd.") and on how recognition module 240 is implemented. For example, if the reference voltage is the power's ground level, the bridged peripheral device recognition contacts 292, 293, and 295 may be interpreted as binary values "0", in which case the peripheral device's type code is "0010" or "0100", depending on which peripheral device recognition contact (i.e., contact 292 or 295) is regarded by recognition module 240 as the Most Significant Bit ("MSB") and which peripheral device recognition contact is regarded as the Least Significant Bit ("LSB"). By way of example, peripheral adaptor 220 includes four bits (i.e., contacts 292 through 295), which means that it can be programmed to indicate 16 ($2^4$) binary codes, each binary code (which is referred to herein as "peripheral's type code") indicating a different type of peripheral device. Changing a peripheral's type code requires changing the bridges (i.e., changing the wiring setup 290).

For example, for a peripheral's type code "0000" it is required to bridge also peripheral device recognition contact 294. Recognition module 240 uses the peripheral's type code to set a communication path from host data contacts 250 to a suitable port of host 270.

Figure 3:
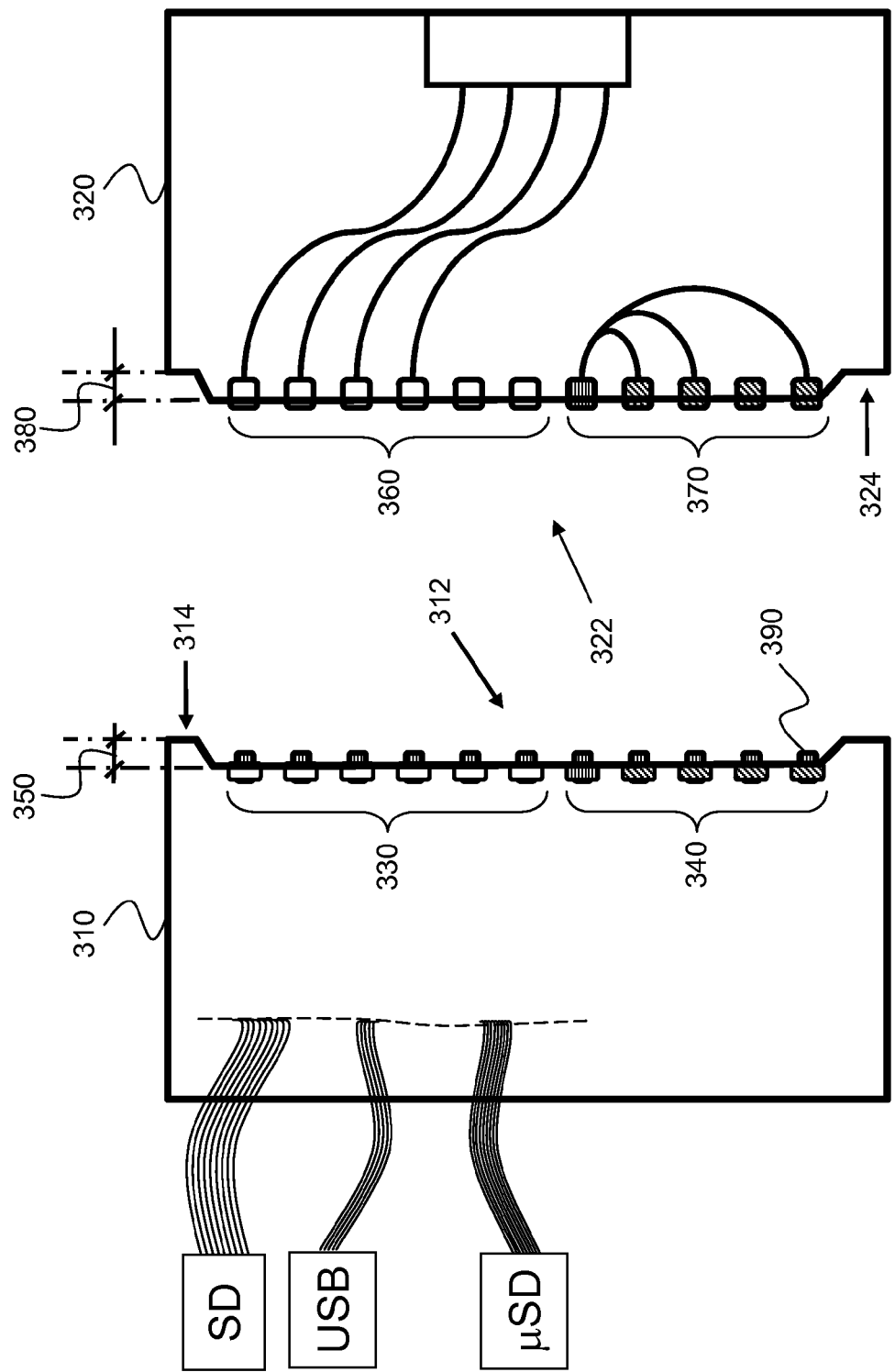
FIG. 3 is a peripheral device adaptor according to an example embodiment.

FIG. 3 illustrates a host adaptor 310 and a peripheral adaptor 320 according to example embodiment. In this embodiment, host data contacts 330 and host recognition contacts 340 of peripheral-adaptor-side interface 312 are recessed (the recession being shown at 350) relative to an external face 314 of peripheral-adaptor-side interface 312, and peripheral data contacts 360 and peripheral device recognition contacts 370 of host-adaptor-side interface 322 are protruding (the protrusion being shown at 380) relative to an external face 324 of host-adaptor-side interface 362. Alternatively, electrical contacts 330 and 340 may protrude relative to external surface 314 and electrical contacts 360 and 370 may be recessed relative to external surface 324. Recess 350 and protrusion 380 (or the alternative recession-protrusion design) ensure reliable engagement between host adaptor 310 and peripheral adaptor 320.

Each of host data contacts 330 and host recognition contacts 340 may include a spring contact, such as spring contact 390, that fully extends outward (i.e., to the right side in FIG. 3) when host adaptor 310 and peripheral adaptor 320 are disengaged, and partially forced inwards by a light force that is exerted thereon by the opposing peripheral contact while host adaptor 310 and peripheral adaptor 320 are engaged.

Figure 4:
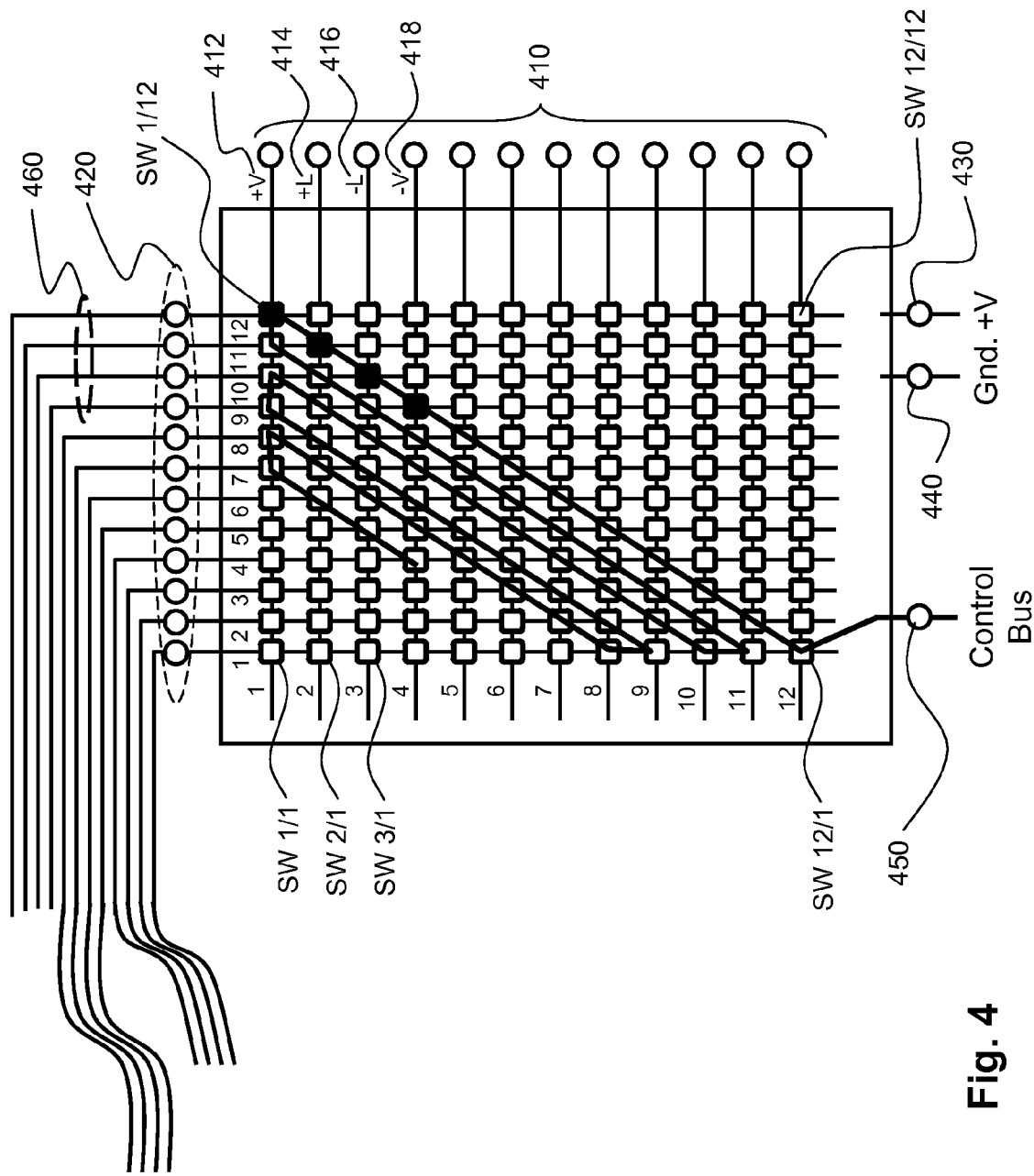
FIG. 4 is a switching matrix according to an example embodiment.

FIG. 4 illustrates a switching matrix 400 according to an example embodiment. By way of example, switching matrix 400 includes 144 controllable switches that are arranged in an array of 12 columns by 12 lines. The 12×12 array of controllable switches are designated as SW 1/1, SW 1/2, . . . , SW 1/12; SW 2/1, SW 2/2, . . . , SW 2/12; SW 3/1, SW 3/2, . . . , SW 3/12; SW 4/1, SW 4/2, . . . , SW 4/12, . . . ,; SW 12/1, SW 12/2, . . . , SW 12/12.

Switching matrix 400 includes an array of input/output ("I/O") lines 410 that are connected to the related host data contacts (e.g., to host data contacts 250 of FIG. 2), and I/O lines 420 that are connected to the related host's ports (e.g., to the ports of host 270 of FIG. 2). Switching matrix 400 also includes power terminals (i.e., "+V" terminal 430 and "Gnd. terminal 440) and a control bus 450.

Each of the array switches can be in two states, not at the same time; i.e., "activated"/"conducting" or "deactivated"/"non-conducting". Each of the array switches has an associated unique bus address by which it can be accessed, and includes a control input to allow transition of its state from the activated state to the deactivated, and vice versa. The switches' control inputs are not shown in FIG. 4. Control bus 450 is connected to every one of the 144-array of switches.

Depending on the peripheral's type code received by a recognition module (e.g., by recognition module 240 of FIG. 2) from the related wiring setup (e.g., from wiring setup 290 of FIG. 2), the recognition module activates the suitable switches among the 12×12 controllable switches and deactivates the other switches. The recognition module activates and deactivates a switch by addressing the switch via control bus 450 and by sending to its control input a corresponding control signal, optionally over control bus 450.

By way of example, it is assumed that switching matrix is configured by the recognition module for a peripheral device that is a USB device that has to be connected to a host through a USB cable 460. Accordingly, the recognition module uses control bus 450 to activate only switches SW 1/12, SW 2/11, SW 3/10, and SW 4/9 in order to create continuous USB lines (i.e., USB power line "+V" 412, USB data line "+L" 414, USB data line "−L" 416, and USB power line "−V" 418) between the USB device and its host. Switches SW 1/12, SW 2/11, SW 3/10, and SW 4/9 are shown in FIG. 4 as black boxes to distinguish them from the deactivated switches. The activated switches Power terminals 430 and 440 may be connected to the power line of the host through suitable switches or directly; i.e., from suitable terminals of I/O terminals 420.

Figure 5:
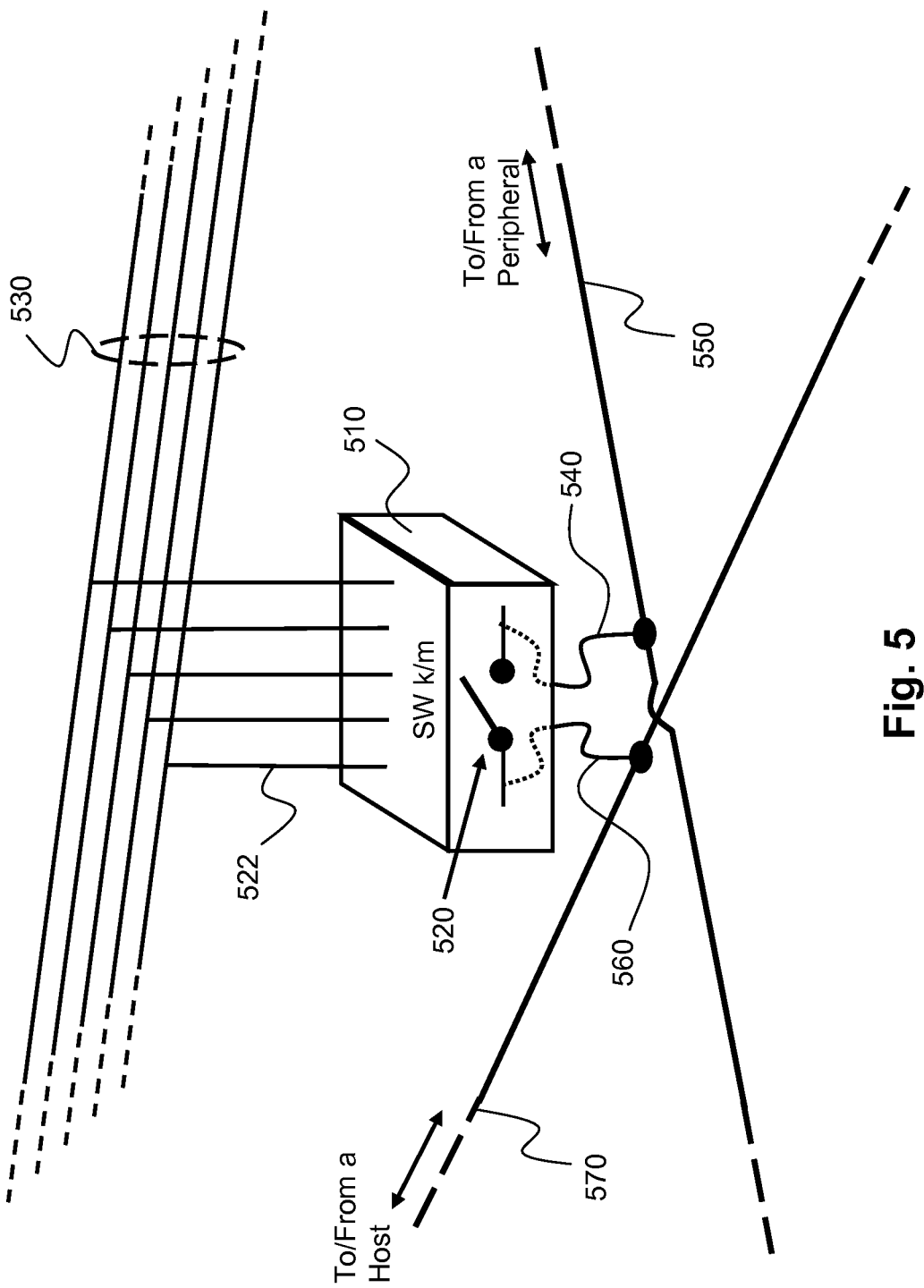
FIG. 5 shows a controllable switch according to an example embodiment.

FIG. 5 shows a controllable switch 510 according to an example embodiment. Controllable switch 510 has a unique address by which a recognition module such as recognition module 240 of FIG. 2 can access it via control bus 530. Controllable switch 510 also includes an address decoder (not shown in FIG. 5), a switch 520, and, optionally, a control input 522. The address decoder monitors control bus 530 and if the address sent over it is identical to the unique address of controllable switch 510, the address decoder activates switch 520 or, optionally, enables its activation via control input 522.

Side "a" of switch 520 is wired 540 to data line 550 that transfers data to and from a peripheral device (the peripheral device is not shown in FIG. 5). Side "b" of switch 520 is wired 560 to data line 570 that transfers data to and from a host (the host is not shown in FIG. 5). While activated, switch 520 connects data line 550 to data line 570.

Figure 6:
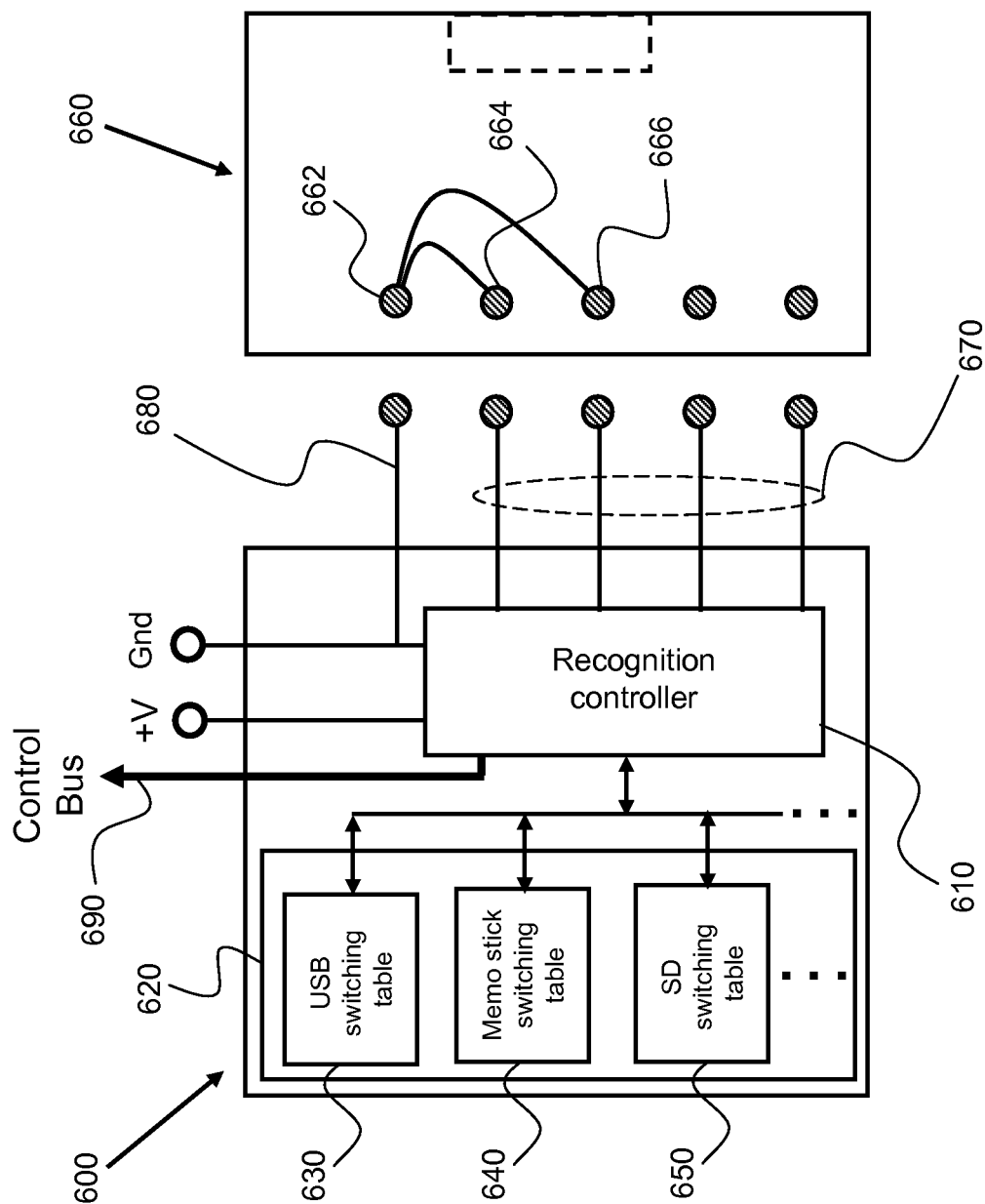
FIG. 6 is a simplified block diagram of a recognition module according to an example embodiment.

FIG. 6 shows a recognition module 600 according to an example embodiment. Recognition module 600 includes a recognition controller 610 and a switching table 620. Switching table 620 includes multiple sets of switching information, each set corresponding, or is associated with, a different peripheral's type code. The number of switching information sets matches the number of types of the peripheral devices for which the host-peripheral adaptor (the combination of host adaptor and peripheral device adaptor) is designed.

The multiple sets of switching information may be arranged in separate switching tables. For example, switching table 620 may include a switching table 630 for USB devices, a switching table 640 for memory stick devices, a switching table 650 for SD cards, and so on.

While the related peripheral adaptor is engaged with a host adaptor 660, the reference voltage (in this example the "Gnd.") is transferred to peripheral device recognition contact 662 via host common contact 670, and recognition signals flow between recognition module 600 and peripheral adaptor 660 to indicate the peripheral's type code associated with peripheral adaptor 660 to recognition controller 610.

The recognition signals flowing between recognition module 600 and peripheral adaptor 660 include providing the reference voltage "Gnd." to peripheral device recognition contact 662 and returning the reference voltage to recognition controller 610 via the peripheral device recognition contacts corresponding to the desired peripheral's type code, in this example via peripheral device recognition contacts 664 and 666. In the example shown in FIG. 6 the peripheral's type code is, therefore, "0011" if peripheral device recognition contact 664 represents the MSB of the code, or "1100" if peripheral device recognition contact 664 represents the LSB of the code. As explained above, different peripheral adaptors may have different wiring setups to accommodate for different types of peripheral devices.

Based on the peripheral's type code (in this example "0011" or "1100", as explained above), the recognition controller 610 finds in switching table 620 the switching table (e.g., switching table 630) corresponding to that peripheral's type code. Then, recognition controller 610 translates the switching information held in that switching table into corresponding switching control signals. Then, recognition controller 610 forwards the switching control signals, via Control Bus 612, to the related switching matrix to activate the suitable controllable switches, to thereby create a communication path between suitable host data contacts and host port (the host data contacts and port are not shown in FIG. 6).

Figure 7:
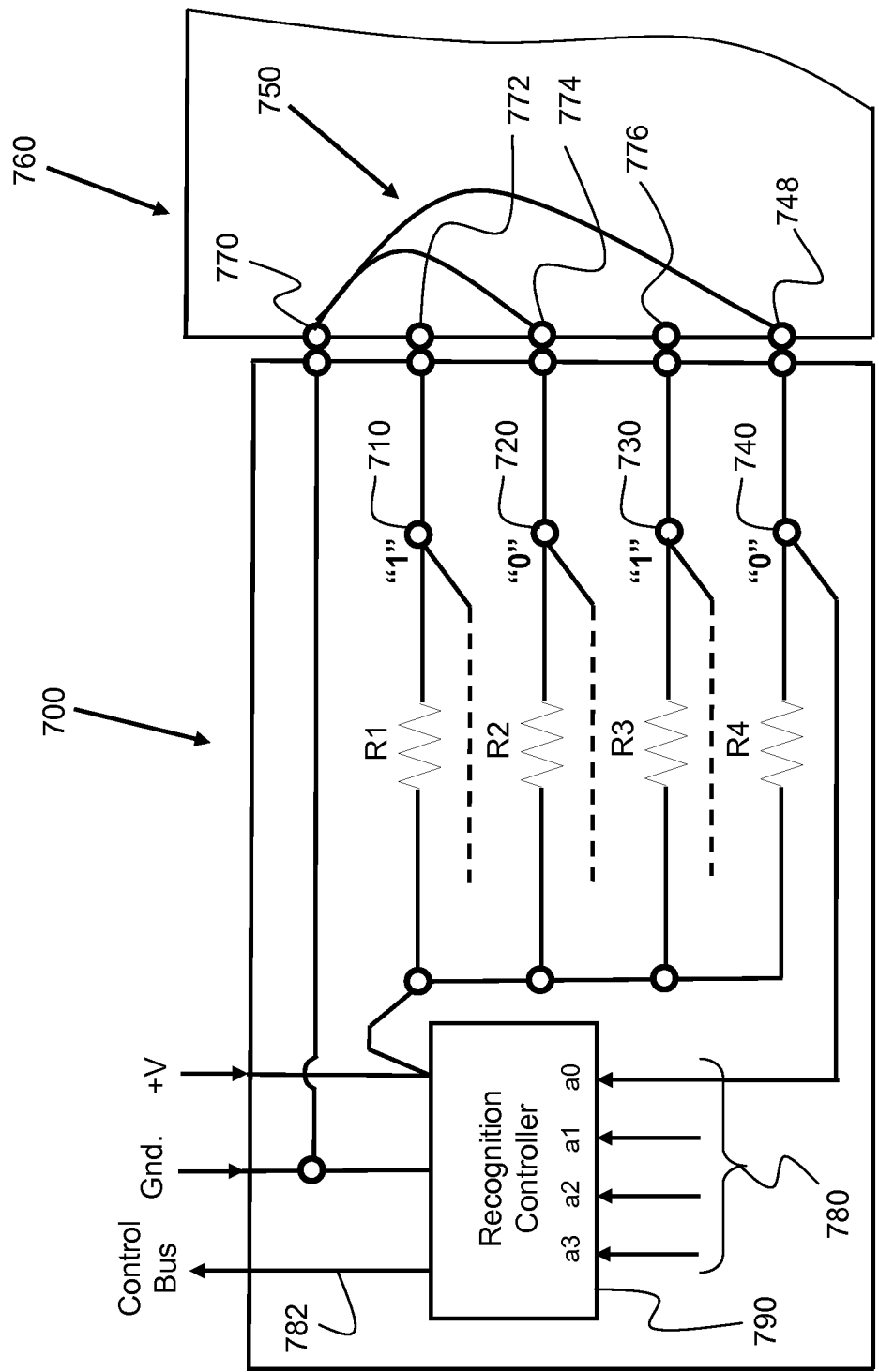
FIG. 7 shows a recognition module according to another example embodiment.

FIG. 7 schematically illustrates a recognition module 700 according to another example embodiment. Recognition module 700 includes five pull-up resistors, which are designated as "R1", "R2", "R3", and "R4". Briefly, a pull-up resistor "pulls" the voltage of the wire it is connected to towards a voltage that represents logic "high" (binary value "1") if the wire is not driven or affected by another input. However, the resistor's resistance is high enough so that if the other input is connected to the wire, it can "pull" down the voltage at the wire toward a voltage level that represents logic "low" (binary value "0"). Pull-up resistors R1, R2, R3, and R4 are respectively associated with four bits 710, 720, 730, and 740 of a related peripheral's type code. In other embodiments peripheral's type codes can have less than four bits or greater then four bits.

The binary values of bits 710, 720, 730, and 740 is "1", "0", "1", "0", respectively (i.e., the peripheral's type code is "1010" or "0101", as explained above) because of the wiring setup 750 in peripheral adaptor 760. That is, the reference voltage "Gnd." is applied (via peripheral device recognition contact 700) only to peripheral device recognition contacts 774 and 748. Therefore, the voltage at the right-hand side of resistors R2 and R4 is forced (i.e., pulled down) to zero (i.e., the binary values of bits 720 and 740 is "0"), whereas the voltage at the right-hand side of resistors R1 and R3 is pulled up to "+V" (i.e., the binary values of bits 710 and 730 is "1").

The binary values of bits 710, 720, 730, and 740 constituting the peripheral's type code are respectively fed 780 to the binary inputs "a3", "a2", "a1", and "a0", of recognition controller 790, and recognition controller 790 uses the binary code to select and translate corresponding switching information into corresponding switching control signal(s) 782. Although not shown in FIG. 7, recognition module 700 includes a switching table similar to switching table 620 of FIG. 6, from which recognition controller 790 obtains the switching information pertaining to the read peripheral's type code.

Figures 8, 9:
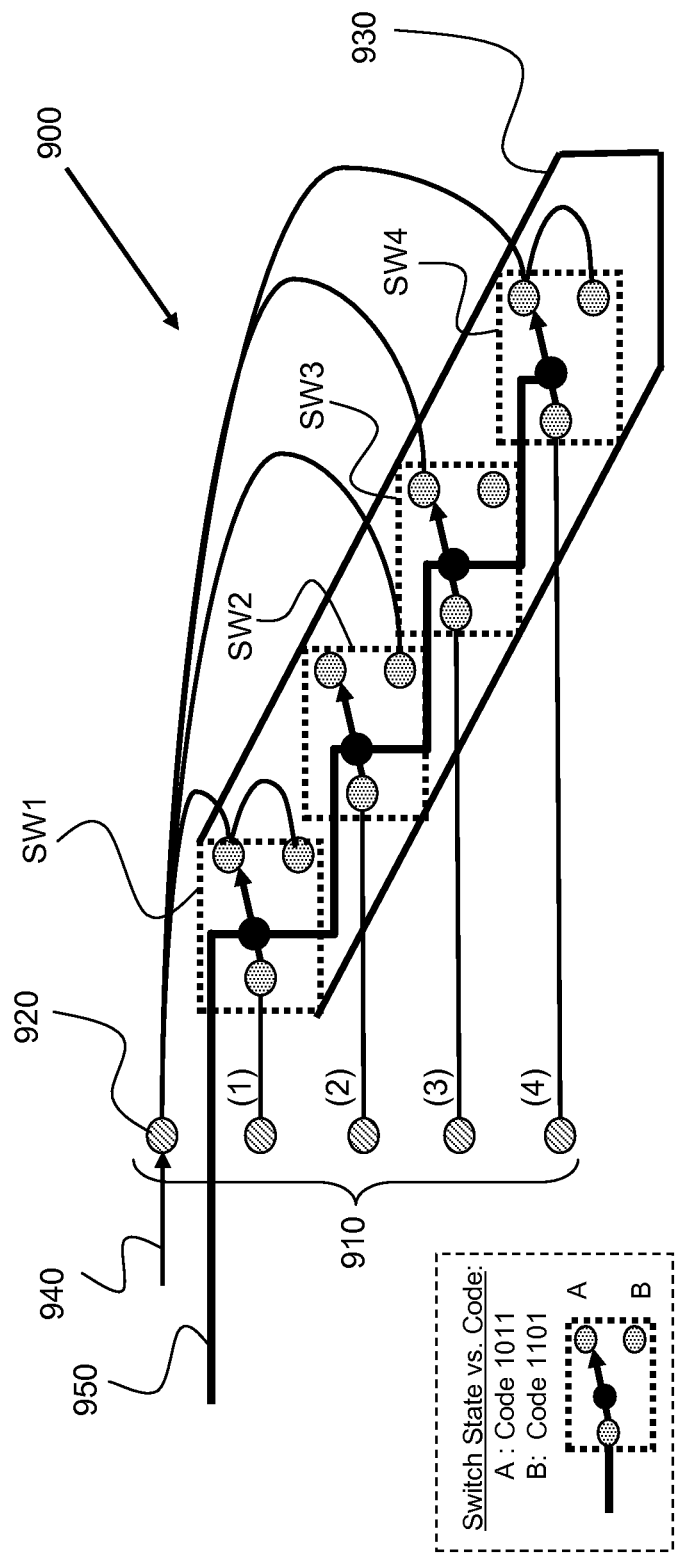
FIG. 8 is a switching table according to an example embodiment.
FIG. 9 shows a code selection switch according to an example embodiment.

FIG. 8 is a switching table 800 according to an example embodiment. Switching table 800 includes an entry for each peripheral's type code. Only the entries associated with the peripheral's type codes "0000" (shown at 810), "0001" (shown at 820), "0010" (shown at 830) and "0011" (shown at 820) are shown in FIG. 8. Switching table 800 also includes a column for each switch of the related switching matrix.

For each peripheral's type code, the related entry includes corresponding switching information that enables a recognition controller to activate or deactivate the correct controllable switches. By way of example, according to the switching information for the peripheral's type code "0000" (shown at 810) switch "SW 1/1" should be deactivated (the deactivation information is shown as "NA"); switch "SW 1/2" should be activated (the activation information is shown as "AC"); switch "SW 1/12" should be activated (the activation information is shown as "AC"), and switch "SW 2/1" should be activated (the activation information is shown as "AC"). The switching information pertaining to the other pertinent switches is omitted. Likewise, according to the switching information for the peripheral's type code "0001" (shown at 820) switch "SW 1/1" should be activated; switch "SW 1/2" should be deactivated; switch "SW 1/12" should be activated, and switch "SW 2/1" should be deactivated.

Each table entry may be regarded as a separate switching table. For example, if peripheral's type code "0000" (shown at 810) pertains to a USB device, then the switching information in the pertinent table's entry maybe regarded as a USB switching table, as demonstrated in FIG. 6 (i.e., USB switching table 630).

FIG. 9 schematically illustrates a wiring setup 900 in a peripheral adaptor according to an example embodiment. Wiring setup 900 includes peripheral device recognition contacts 910 and a switch that is referred to herein as a "code selection switch". By way of example, code selection switch includes four switches: "SW1", "SW2", "SW3", and "SW4". The number of switches of a code selection switch can differ from the number of the peripheral device recognition contacts after excluding the common contact, which is the contact receiving the reference voltage from the recognition module. Common contact 920, an exemplary common contact, receives 940 the reference voltage from an opposing host recognition contact which is not shown in FIG. 8. Code selection switch 930 could include, for example, only two code selection switches (e.g., SW2 and SW3, or SW1 and SW2, or any other two-switch combination).

Each switch SWi ("i"=1, 2, 3, 4) of code selection switch 930 includes two inputs. Each of the two inputs may be wired ("bridged") to common contact 920 or left unwired. For example, the two inputs of switch SW1 and the two inputs of switch SW4 are connected to common contact 920, whereas only one input of switch SW2 (i.e., its lower input) and only one input of switch SW3 (i.e., its upper input) are connected to common contact 920. Each switch SWi ("i"=1, 2, 3, 4) of code selection switch 930 also includes one output that is connected to a peripheral device recognition contact. The output of SW1 is connected to peripheral device recognition contact (1); the output of SW2 is connected to peripheral device recognition contact (2), and so on.

Each switch SWi ("i"=1, 2, 3, 4) also includes a control input that is connected to a control bus 850 directly or through other switches. Code selection switch 830 can be operated automatically, by using control bus 940 (as shown in FIG. 9). Alternatively, code selection switch 930 can be operated manually. The control signals transferred to code selection switch 930 through control bus 950 may originate, for example, from a recognition module such as recognition module 240 of FIG. 2, or from a host such as host 270 of FIG. 2, in response to a suitable user selection input. Some of the unused host/peripheral data lines may be used as control bus 950.

Switches SW1 through SW4 are so configured that they simultaneously transition between a first state (i.e., the "upper" state, or state "A") and a second state (i.e., the "lower" state, or state "B"), where each state results in a different peripheral's type code. By way of example (i.e., per the exemplary wiring setup 900 and assuming that the peripheral device recognition contact connected to the output of SW2 is predetermined as the MSB and a corresponding circuitry is used), in state "A" the peripheral's type code is "1011" and in state "B" the peripheral's type code is "1101".

A code selection switch can be configured so that each of its switches has three inputs and one output. Such a code selection switch would have three selectable states corresponding to three peripheral type codes. If the peripheral adaptor has one socket that can accommodate one peripheral device's form factor but there are two or more such peripheral devices that use different communication protocol, then the code selection switch can be set to the state corresponding to an engaged peripheral device. The code selection switch can also be used in cases where the peripheral adaptor includes two or more sockets, as shown in FIG. 10, which is described below.

Figure 10:
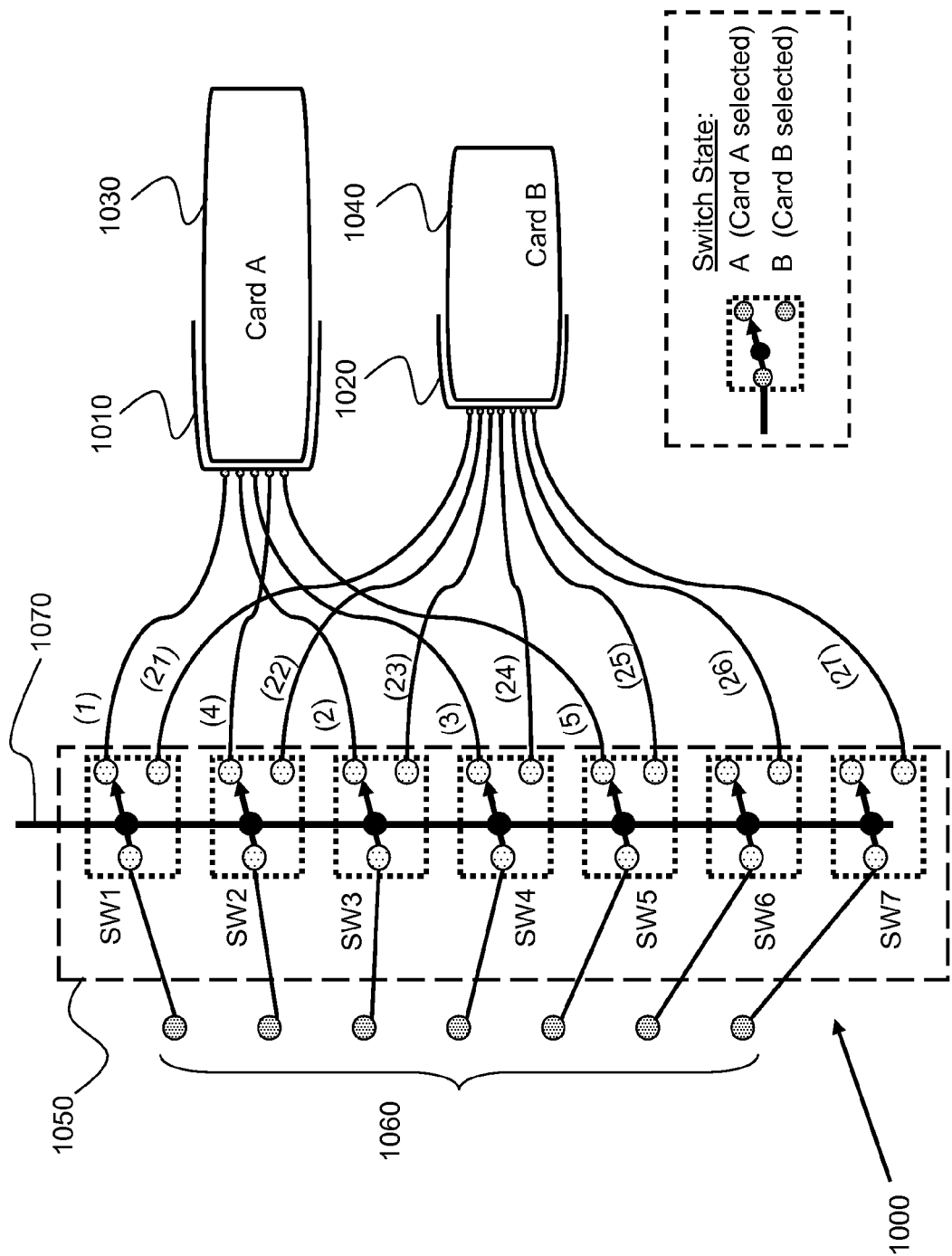
FIG. 10 shows a card selection switch according to an example embodiment.

FIG. 10 shows a peripheral adaptor 1000 according to an example embodiment. Peripheral adaptor 1000 includes two sockets 1010 and 1020. Socket 1010 is configured to accommodate a first type of peripheral devices (e.g., storage device "Card A", shown at 1030), and socket 1020 is configured to accommodate a second type of peripheral devices (e.g., storage device "Card B", shown at 1040). Card A and Card B have, in this example, a different form factor, and they may use the same communication protocol or different communication protocols.

Peripheral adaptor 1000 also includes a switch 1050 (referred to hereinafter as a "card selection switch"). A card selection switch may include a number of controllable switches that matches the number of peripheral device data contacts 1060, a controllable switch for each peripheral device data contact. Each of the switches of the card selection switch may have two inputs and one output. By way of example, card selection switch 1050 includes seven controllable switches, which are designated as "SW1", "SW2", "SW3", "SW4", "SW5", "SW6", and "SW7", and the output of each controllable switch is connected to one of peripheral device data contacts 1060.

Card selection switch 1050 can transition between state "A" (i.e., the moving contact is up in FIG. 10) in which peripheral device 1030 is selected and peripheral device 1040 is deselected, and state "B" (i.e., the moving contact is low in FIG. 10), in which peripheral device 1030 is deselected and peripheral device 1040 is selected. Depending on the wiring configuration of socket 1010 (i.e., depending on which of the data contacts 1060 are assigned to socket 1010), upper inputs of the suitable controllable switches SWi ("i"=1, 2, ..., 7) are wired to socket 1010. By way of example, socket 1010 is connected by five conductors (i.e., by conductors (1), (2), (3), (4), (5)) to the desired five peripheral device data contacts 1060 as described below. The upper input of switch SW1 is connected to socket 1010 by the wire designated as "(1)"; the upper input of switch SW2 is connected to socket 1010 by the wire designated as "(4)"; the upper input of switch SW3 is connected to socket 1010 by the wire designated as "(2)"; the upper input of switch SW4 is connected to socket 1010 by the wire designated as "(3)"; and the upper input of switch SW5 is connected to socket 1010 by the wire designated as "(5)".

Likewise, socket 1020 is connected by seven conductors (i.e., by conductors (21), (22), (23), (24), (25), (26), (27)) to the desired seven peripheral device data contacts 1060 as described below. The lower input of switch SW1 is connected to socket 1020 by the wire designated as "(21)"; the lower input of switch SW2 is connected to socket 1020 by the wire designated as "(22)"; the lower input of switch SW3 is connected to socket 1020 by the wire designated as "(23)"; the lower input of switch SW4 is connected to socket 1020 by the wire designated as "(24)"; the lower input of switch SW5 is connected to socket 1020 by the wire designated as "(25)"; the lower input of switch SW6 is connected to socket 1020 by the wire designated as "(26)"; and the lower input of switch SW7 is connected to socket 1020 by the wire designated as "(27)".

A controllable switch of card selection switch 1050 may serve only socket 1010, only socket 1020, or both sockets 1010 and 1020. For example, switch "SW1" serves both sockets (i.e., it connects the associated peripheral device data contact/line to socket 1010 when it is in state "A", and to socket 1020 when it is in state "B"). Switch "SW6" (for example) serves only socket 1020. Card selection switch 1050 receives control signals via control bus 1070 to facilitate selection of state "A" or state "B".

Figure 11:
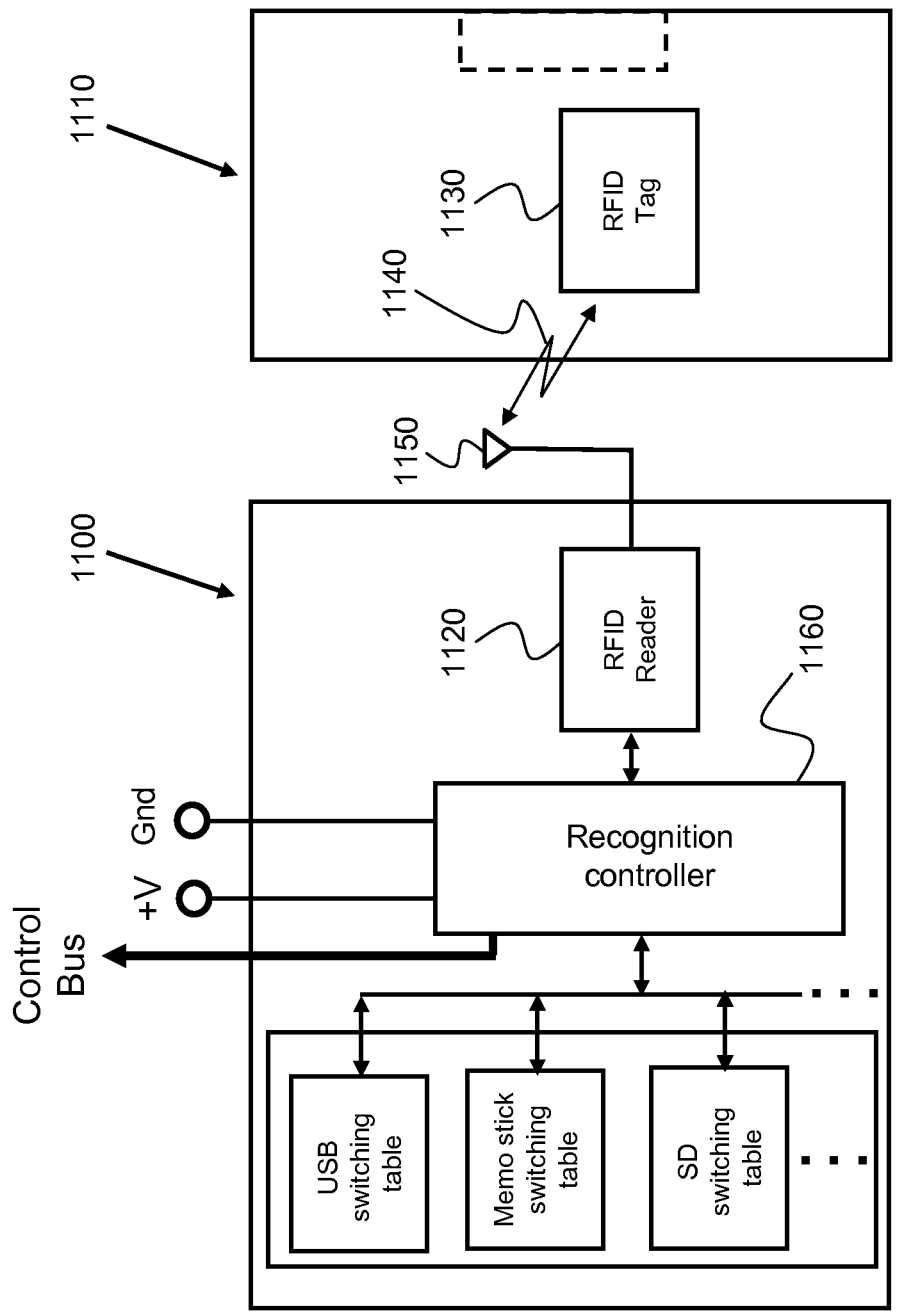
FIG. 11 shows a way for recognizing a peripheral device's type code according to another example embodiment.

FIG. 11 shows a recognition module 1100 and a peripheral adaptor 1110 according to an example embodiment. In this embodiment, recognition module 1100 recognizes the type of peripheral adaptor 1110 (and thus the type of the peripheral device) by using a pair of contactless RFID reader and contactless RFID tag. Because recognition module 1100 has to read the peripheral's type code from the peripheral adaptor 1110, recognition module 1100 includes a contactless RFID reader 1120 and peripheral adaptor 1110 includes a contactless RFID tag 1130.

Contactless RFID tag 1130 is configured to transmit 1140 the peripheral's type code to RFID reader 1120 through RFID reader antenna 1150, and the recognition signals flowing between recognition module 1100 and peripheral adaptor 1110 includes the wireless communication signals that are transferred between RFID reader 1120 and RFID tag 1130. That is, RFID reader 1120, which can be embedded in recognition module or reside external to it, recognizes the type code of peripheral adaptor 1110 by reading identification (ID) information that is held by RFID tag 1130. Recognition controller 1160, then, reads the ID information received from RFID tag 1130, which pertains to the type of peripheral adaptor 1110.

The RFID reader used by recognition module 1100 can be, for example, RFID reader model 5321, by Omnikey-Walluf, Germany. The reading range covered by RFID reader 1120 (i.e., the RFID reader's sensitivity) can be limited to few millimeters, and antenna 1150 can be located behind the user's console panel (e.g., behind panel 140 of FIG. 1), in close proximity to the connector 154.

As known in the art of RFID field, RFID tags do not contain a power source because they are powered by the electromagnetic energy emitted by the RFID reader with which they operated. Therefore, there is no need for peripheral device/host recognition conductors and contacts such as those shown in FIG. 2.

Figure 12:
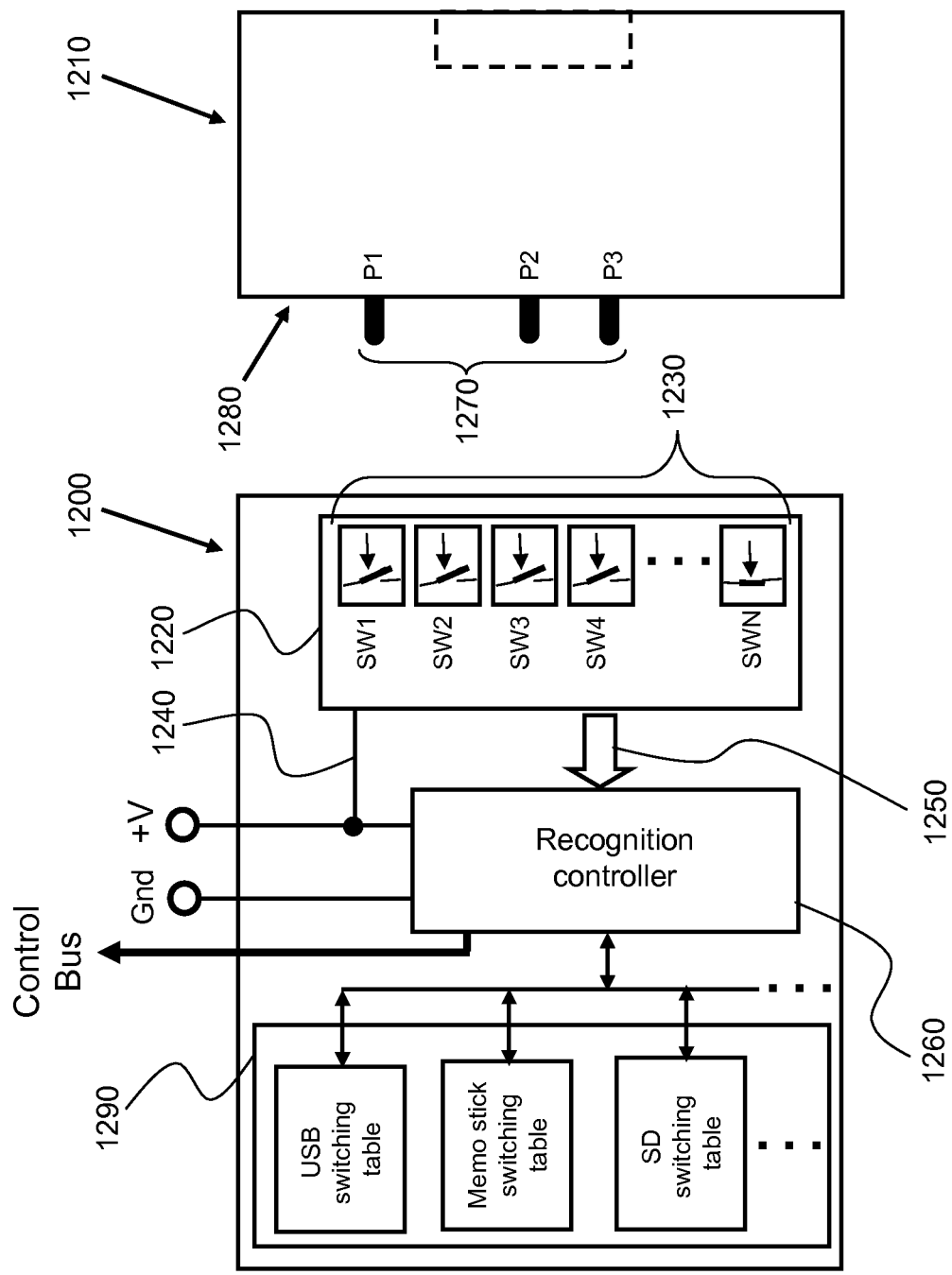
FIG. 12 shows a way for recognizing a peripheral device's type code according to yet another example embodiment.

FIG. 12 shows a recognition module 1200 and a peripheral adaptor 1210 according to an example embodiment. In this embodiment, recognition module 1200 recognizes the type of peripheral adaptor 1210 (and thus the type of the peripheral device) by using a "protrusion-actuated switch" mechanism.

Recognition module 1200 includes a protrusion-actuated switch mechanism 1220. Protrusion-actuated switch mechanism 1220 includes N momentary switches 1230 (the switches are designated as "SW1", "SW2", "SW3", ..., "SWN"). Each of switches "SW1" through "SWN" can transition between "open" state and "closed" state. Each of switches 1230 is actuated by pushing a protruding rod that is mechanically coupled to a moving electrical contact. A current state of a switch SWi (i=1, 2, 3, ..., N) depends on the type of switch (i.e., "normally open" (N.O.) or "normally closed" (N.C.)) and on whether the switch is actuated. By way of example, switches "SW1" through "SW4" are N.O. and no actuation force is exerted thereon, for which reason they are in the "open" state; and SWN is N.C. and no actuation force is exerted thereon, for which reason it is in the "closed" state. An input terminal of each switch SWi is connected to the "+V" line 1240 and an output terminal of the switch is connected 1250 to an input terminal of recognition controller 1260 (the electrical connections of the switches are not shown in FIG. 12).

Peripheral adaptor 1210 includes, in this example, three protrusions 1270 (the protrusions are designated as "P1", "P2", "P3") whose physical layout (i.e., their number and location on an external surface 1280 of peripheral adaptor 1210) is indicative of the type code of peripheral adaptor 1210. When peripheral adaptor 1210 and the related host adaptor are held together, protrusions P1, P2, and P3 respectively actuate SW1, SW3, and SW4. Actuation of switches SW1, SW3, and SW4 causes recognition signals indicative of the pertinent peripheral's type code to flow through them to corresponding inputs of recognition controller 1260. Based on the recognition signals, recognition controller 1260 selects the switching information pertaining to peripheral adaptor 1210. In this embodiment there is no need for peripheral device/host recognition conductors and contacts such as those shown in FIG. 2.

All the momentary switches 1230 may be N.O. or N.C., or some of them maybe N.O. and the other may be N.C. Momentary switches 1230 may be arranged in a linear line or in any other desired fashion. For example, they may be arranged in one or more circles or be circumscribed in a triangular line.

Figure 13:
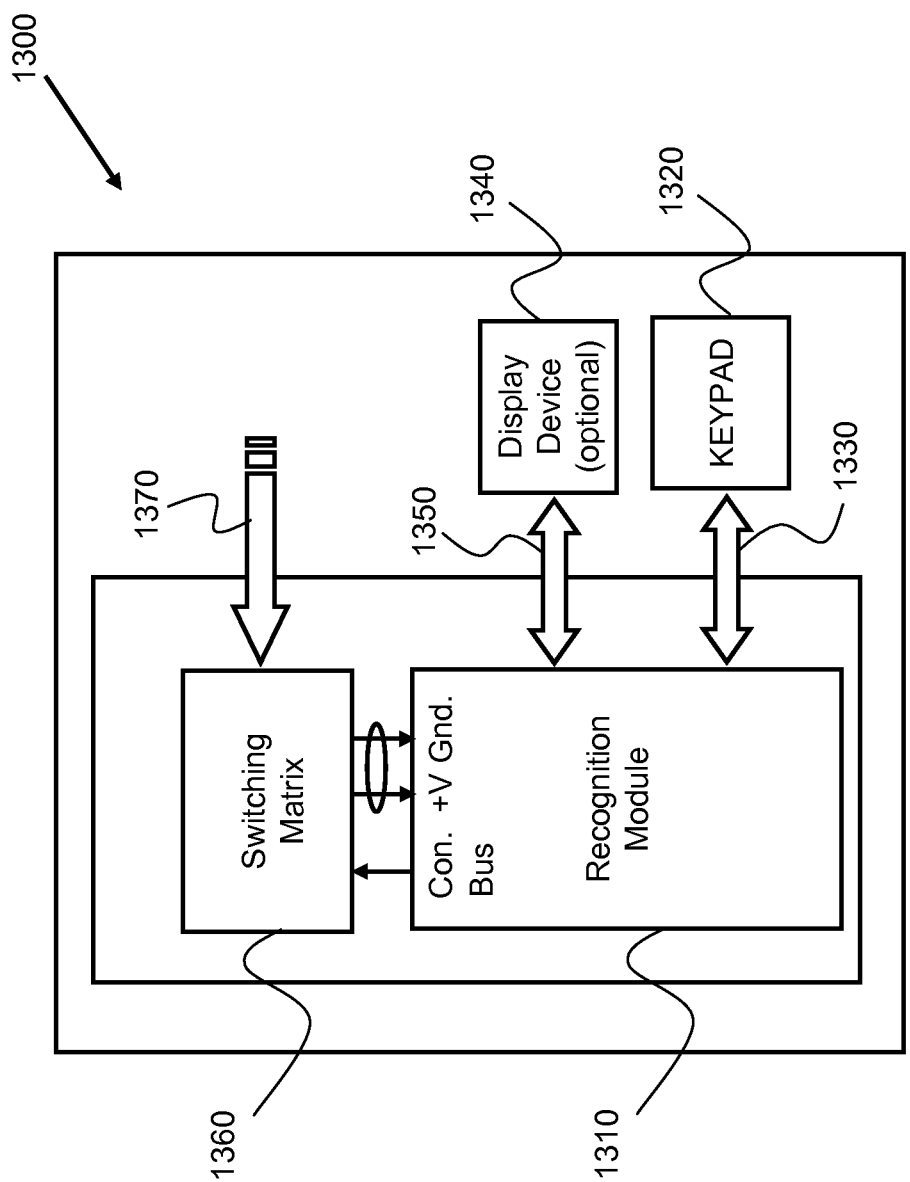
FIG. 13 shows a way for recognizing a peripheral device's type code according to still another example embodiment.

FIG. 13 shows a host adaptor 1300 according to an example embodiment. In this embodiment, recognition module 1310 recognizes the type of the peripheral device (the peripheral device is not shown in FIG. 13) by using a keypad 1320. The operator of host adaptor 1300 enters the pertinent peripheral's type code through keypad 1320, and the peripheral's type code is transferred to recognition module 1310 via communication link 1330. In an alternative way, the operator may select the pertinent peripheral's type code from a menu of peripheral adaptor types that is displayed on a display device such as display device 1340. Display device 1340 may be a touch screen, in which case keypad 1320 can be spared and the pertinent peripheral's type code can be transferred to recognition module 1310 via communication link 1350. In response to entering the pertinent peripheral's type code, recognition module 1310 transfers control signals to switching matrix 1360 to activate corresponding switches, to thereby set up the desired communication path (i.e., to electrically link) between data lines 1370 and the suitable host port (the suitable host port is not shown in FIG. 13).

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. For example, FIG. 1 shows the peripheral device and the peripheral adaptor as separate objects. However, other configurations may be used, in which the peripheral device and the peripheral adaptor are one object (i.e., they are inseparable). Such an object would have a connector similar to peripheral-adaptor-side interface 154 (for example).

Alternative embodiments may, accordingly, include more modules, fewer modules, and/or functionally equivalent modules. The present disclosure is relevant to various types of mass storage devices such as SD-driven flash memory cards, flash storage devices, non-flash storage devices, "Disk-on-Key" devices that are provided with a Universal Serial Bus ("USB") interface, USB Flash Drives ("UFDs"), MultiMedia Cards ("MMC"), Secure Digital ("SD") cards, miniSD cards, microSD cards, and so on. Hence the scope of the claims that follow is not limited by the disclosure.

What is claimed is:

1. A peripheral adaptor comprising:
a peripheral-side interface configured to transfer data to and from a peripheral device; and
a host-adaptor-side interface configured to:
operatively connect to a peripheral-adaptor-side interface of a host adaptor, wherein the host adapter includes at least one of a touch screen display device and a keypad configured to receive recognition information from a source, wherein the recognition information indicates a peripheral device type, the peripheral device type characterizing the peripheral device, the source distinct from the peripheral device and distinct from a host of the peripheral device; and
transfer the data between the peripheral-side interface and the host via a data path that couples the peripheral device and the host, wherein the data path is selected by the host adapter from among a plurality of selectable data paths based on the recognition information.

2. The peripheral adaptor of claim 1, further comprising:
a second peripheral-side interface operable to accommodate a second peripheral device; and
a switch to facilitate selection between the peripheral-side interface and the second peripheral-side interface.

3. The peripheral adaptor of claim 1, wherein the host-adaptor-side interface includes a contact that is recessed relative to an external face of the peripheral adaptor.

4. The peripheral adaptor of claim 1, wherein the host-adaptor-side interface includes a contact that protrudes relative to an external face of the peripheral adaptor.

5. The peripheral adaptor of claim 1, wherein the host-adaptor-side interface includes a spring contact.

6. The peripheral adaptor of claim 1, wherein the peripheral-side interface includes a socket.

7. The peripheral adaptor of claim 1, wherein the host-adaptor-side interface does not include either of a socket and a pin configured to fit a socket.

8. The peripheral adaptor of claim 1, wherein the host-adaptor-side interface includes a substantially planar external surface having multiple conductive protrusions and is configured to be positioned to engage the multiple conductive protrusions into multiple recesses in a substantially planar external surface of the peripheral-adaptor-side interface of the host adaptor.

9. The peripheral adaptor of claim 8, wherein portions of the multiple conductive protrusions that protrude from the substantially planar external surface have a first dimension in a first direction along the substantially planar external surface and a second dimension in a second direction perpendicular to the substantially planar external surface, the first dimension larger than the second dimension.

10. A host adaptor comprising:
at least one of a touch screen display device and a keypad configured to receive recognition information from a source, wherein the recognition information indicates a peripheral device type, the peripheral device type characterizing a peripheral device, the source distinct from the peripheral device and distinct from a host of the peripheral device;
a recognition module to receive the recognition information from the at least one of the touch screen display device and the keypad; and
a switching matrix configurable to select a particular data path of a plurality of selectable data paths based on the recognition information received at the recognition module;
wherein on receipt of the recognition information by the recognition module, the switching matrix is configured to transfer data between the host and the peripheral device via a peripheral device adaptor using the particular data path, the particular data path selected from the plurality of selectable data paths based on the recognition information received at the recognition module from the source.

11. The host adaptor of claim 10, wherein the particular data path comprises one or more connectors, wherein the one or more connectors are configured to transfer the data between the host and the peripheral device according to a communication protocol that is associated with the peripheral device.

12. The host adaptor of claim 10, wherein the recognition module is operable to configure the switching matrix based on the recognition information.

13. The host adaptor of claim 10, further comprising a peripheral-adaptor-side interface having an external surface and electrical contacts situated in a recess of the external surface, wherein at least one of the electrical contacts is designated to couple to the peripheral device.

14. The host adaptor of claim 10, further comprising a peripheral-adaptor-side interface having an external surface and electrical contacts situated on a protrusion of the external surface, wherein at least one of the electrical contacts is designated to couple to the peripheral device.

15. A method of providing an interface between a host device and a peripheral device, the method comprising:
receiving recognition information related to the peripheral device via at least one of a touch screen display device and a keypad, wherein the recognition information indicates a peripheral device type, the peripheral device type characterizing the peripheral device, the recognition information received from a source that is distinct from the peripheral device and that is distinct from a host of the peripheral device;
selecting a particular data path of a plurality of selectable data paths based on the recognition information; and
transferring data between the host device and the peripheral device via a peripheral device adaptor using the particular data path.

16. The method of claim 15, further comprising transferring the data on receipt of the recognition information.

17. The method of claim 15, further comprising using a switching matrix to select the particular data path.

18. The method of claim 15, wherein the host-adaptor-side interface includes a substantially planar external surface having multiple conductive protrusions and configured to be positioned to engage the multiple conductive protrusions into multiple recesses in a substantially planar external surface of a peripheral-adaptor-side interface of a host adaptor.

19. The method of claim 18, wherein portions of the multiple conductive protrusions that protrude from the substantially planar external surface have a first dimension in a first direction along the substantially planar external surface and a second dimension in a second direction perpendicular to the substantially planar external surface, the first dimension larger than the second dimension.

20. The method of claim 15, wherein the particular data path includes one or more connectors, wherein the one or more connectors are configured to transfer the data between the host device and the peripheral device according to a communication protocol that is associated with the peripheral device.

* * * * *